(12) United States Patent
Oita et al.

(10) Patent No.: US 9,523,399 B2
(45) Date of Patent: Dec. 20, 2016

(54) AUTOMATIC TRANSMISSION FOR VEHICLE

(75) Inventors: Shinji Oita, Toyota (JP); Masaru Morise, Aichi (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 14 days.

(21) Appl. No.: 14/359,609

(22) PCT Filed: Nov. 22, 2011

(86) PCT No.: PCT/JP2011/076957
§ 371 (c)(1),
(2), (4) Date: May 21, 2014

(87) PCT Pub. No.: WO2013/076828
PCT Pub. Date: May 30, 2013

(65) Prior Publication Data
US 2014/0299432 A1    Oct. 9, 2014

(51) Int. Cl.
| | |
|---|---|
| F16H 47/06 | (2006.01) |
| F16D 47/06 | (2006.01) |
| F16H 3/66 | (2006.01) |
| F16H 61/14 | (2006.01) |
| F16H 63/30 | (2006.01) |

(52) U.S. Cl.
CPC .......... *F16D 47/06* (2013.01); *F16H 3/66* (2013.01); *F16H 3/663* (2013.01); *F16H 61/14* (2013.01); *F16H 63/3023* (2013.01); *F16H 2063/3093* (2013.01); *F16H 2200/2007* (2013.01); *F16H 2200/2023* (2013.01); *F16H 2200/2043* (2013.01); *F16H 2200/2046* (2013.01); *F16H 2200/2069* (2013.01); *F16H 2200/2084* (2013.01)

(58) Field of Classification Search
CPC .................. F16H 47/06; F16H 3/663
See application file for complete search history.

(56) References Cited

U.S. PATENT DOCUMENTS

| | | | |
|---|---|---|---|
| 5,792,022 A | 8/1998 | Hisano et al. | |
| 5,890,988 A | 4/1999 | Kasuya et al. | |
| 6,955,627 B2* | 10/2005 | Thomas | F16H 3/66 192/51 |
| 2012/0083373 A1 | 4/2012 | Ziemer | |
| 2012/0083374 A1 | 4/2012 | Ziemer et al. | |

FOREIGN PATENT DOCUMENTS

| | | |
|---|---|---|
| JP | 6-73467 | 10/1994 |
| JP | 10-89421 | 4/1998 |
| JP | 2009-127843 | 6/2009 |
| WO | WO 2010/139556 A1 | 12/2010 |
| WO | WO 2010/139558 A1 | 12/2010 |

* cited by examiner

*Primary Examiner* — Derek D Knight
(74) *Attorney, Agent, or Firm* — Finnegan, Henderson, Farabow, Garrett & Dunnner, LLP

(57) ABSTRACT

A vehicle automatic transmission of a multistage type having a plurality of shift stages selectively established depending on a combination of engagement and release of multiple engagement elements, comprises: a torque converter coupled to an input rotating member of the automatic transmission; an oil pump coupled to a pump side of the torque converter, at least one of the multiple engagement elements being a meshing engagement element, and the meshing engagement element being at least partially disposed on an inner circumferential side of at least one of the torque converter and the oil pump.

2 Claims, 3 Drawing Sheets

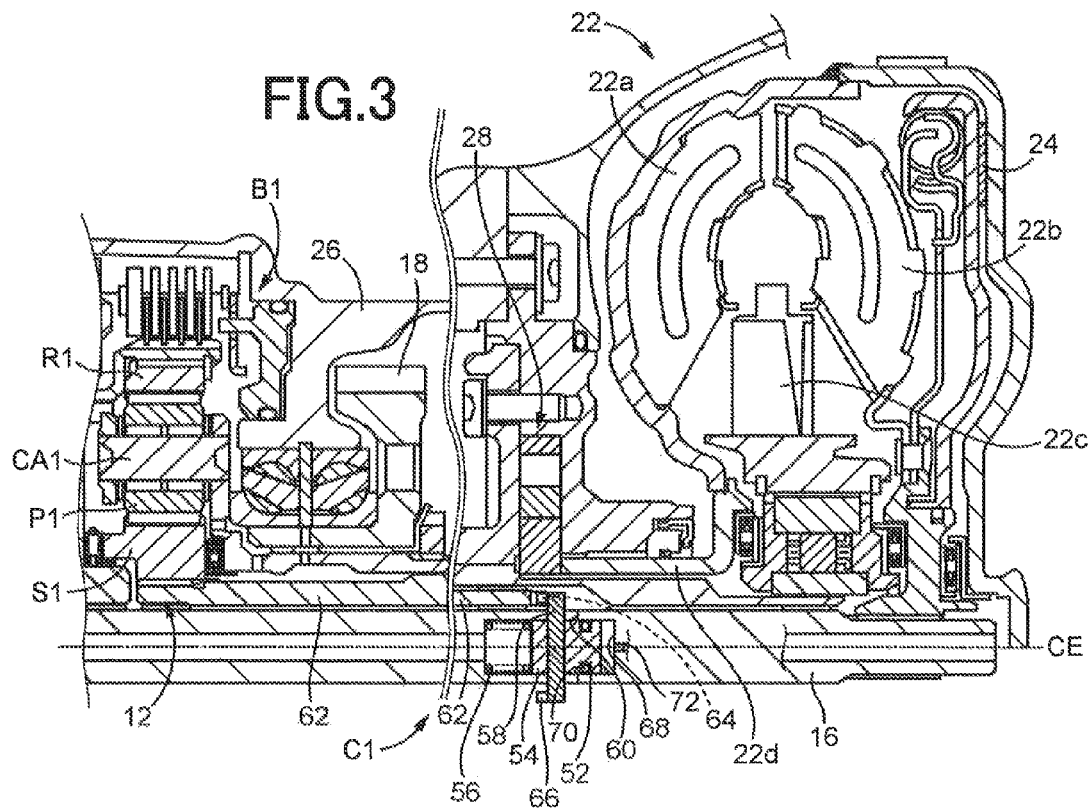
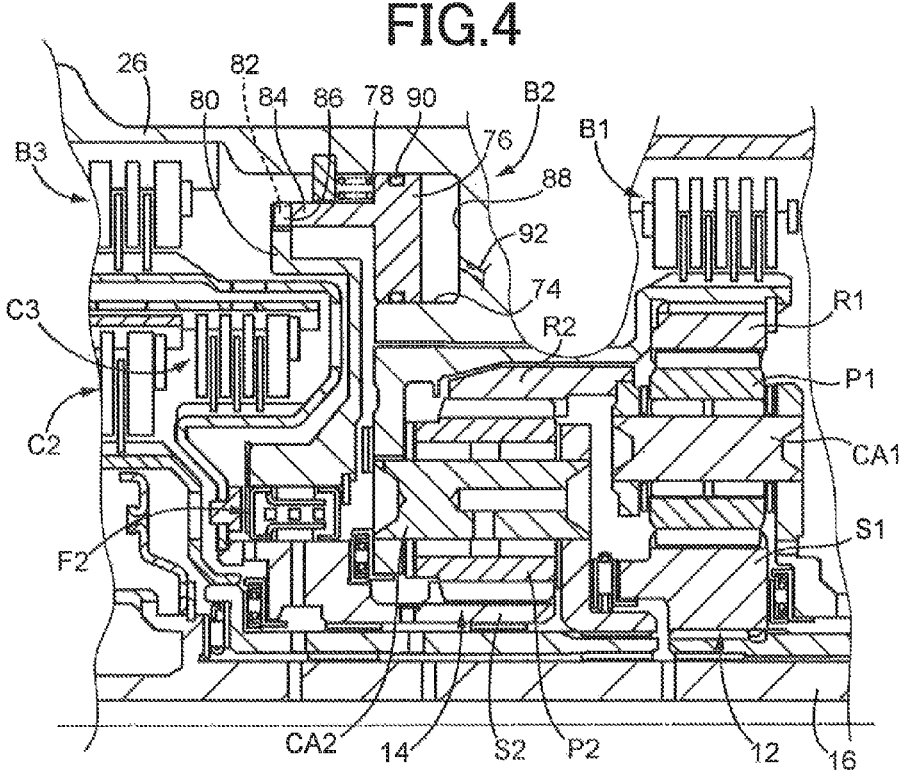

AUTOMATIC TRANSMISSION FOR VEHICLE

CROSS-REFERENCE TO RELATED APPLICATIONS

This application is a national phase application of International Application No. PCT/JP2011/076957, filed Nov. 22, 2011, the content of which is incorporated herein by reference.

TECHNICAL FIELD

The present invention relates to a vehicle automatic transmission and particularly to an improvement for a compact device configuration.

BACKGROUND ART

A multistage vehicle automatic transmission is known that includes multiple engagement elements having an engagement state switched by an oil pressure so as to selectively establish a plurality of shift stages based on a combination of engagement and release of the multiple engagement elements corresponding to an oil pressure supplied from a hydraulic circuit. Although clutches and brakes including wet friction materials have been widely used as the engagement elements in such an automatic transmission, these friction materials have been considered to have a problem of a loss due to drag occurring when these friction materials are not engaged. Therefore, an automatic transmission has been proposed that uses a meshing engagement element, i.e., a so-called dog clutch (meshing clutch) as a substitute for a wet friction material. For example, this corresponds to an automatic transmission depicted in Patent Document 1.

PRIOR ART DOCUMENT

Patent Document

Patent Document 1: WO 2010/139556

SUMMARY OF THE INVENTION

Problem to be Solved by the Invention

However, if a dog clutch is substituted for a wet friction material in the conventional technique, an axial length is required for the disposition thereof and the entire length of the automatic transmission is problematically increased. This problem is newly found out by the present inventors in the course of extensive research for improving performance of a vehicle automatic transmission.

The present invention was conceived in view of the situations and it is therefore an object of the present invention to provide a vehicle automatic transmission with a compact device configuration.

Means for Solving the Problem

To achieve the object, the present invention provides a vehicle automatic transmission of a multistage type having a plurality of shift stages selectively established depending on a combination of engagement and release of multiple engagement elements, comprising: a torque converter coupled to an input rotating member of the automatic transmission; an oil pump coupled to a pump side of the torque converter, wherein at least one of the multiple engagement elements is a meshing engagement element, and wherein the meshing engagement element is at least partially disposed on an inner circumferential side of at least one of the torque converter and the oil pump.

Effects of the Invention

As described above, according to the present invention, since the vehicle automatic transmission of a multistage type comprises: a torque converter coupled to an input rotating member of the automatic transmission; an oil pump coupled to a pump side of the torque converter, at least one of the multiple engagement elements is a meshing engagement element, and the meshing engagement element is at least partially disposed on an inner circumferential side of at least one of the torque converter and the oil pump, the meshing engagement element can be disposed while a change is minimized in design of the other constituent elements, and the entire length of the automatic transmission can be reduced as far as possible. Therefore, the vehicle automatic transmission with a compact device configuration can be provided.

BRIEF DESCRIPTION OF THE DRAWINGS

FIG. 3 is a partial cross-sectional view of a portion of the automatic transmission of FIG. 1 taken along a plane including a center axis for explaining the configuration of the meshing engagement element included in the automatic transmission of FIG. 1.

FIG. 4 is a partial cross-sectional view of a portion of the automatic transmission of FIG. 1 taken along a plane including a center axis for explaining the configuration of the meshing engagement element included in the automatic transmission of FIG. 1.

MODES FOR CARRYING OUT THE INVENTION

Figure 1:
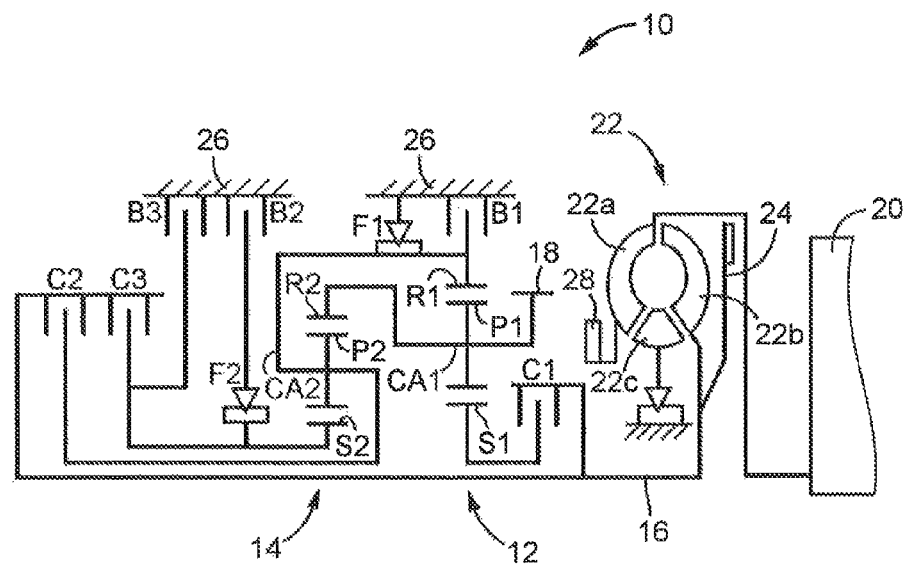
FIG. 1 is a schematic for explaining a configuration of a vehicle automatic transmission to which the present invention is preferably applied.

The meshing engagement element is preferably a meshing engagement device (dog clutch) that includes a pair of engagement members having claw portions engaged with each other corresponding to a pair of respective members to be engaged (prevented from relatively rotating) or released (allowed to relatively rotate) and that has an engagement state switched by the pair of the engagement members relatively moved depending on an oil pressure supplied from a hydraulic circuit. Preferably, the meshing engagement element is an engagement device that includes, for example, a cylinder, a piston disposed to be reciprocable in the cylinder, and a spring biasing the piston in the direction of releasing the engagement of the claw portions such that the engagement device is released when no oil pressure is supplied because the piston is moved in the direction of releasing the engagement of the claw portions due to a biasing force of the spring, while the engagement device is engaged when an oil pressure is supplied because the piston is moved in the direction of meshing the claw portions against the biasing force of the spring.

Although the meshing engagement element is preferably a normally opened engagement element released during the absence of supply of oil pressure when no oil pressure is supplied from the hydraulic circuit and engaged during the supply of oil pressure when an oil pressure is supplied, the meshing engagement element may be a normally closed engagement element engaged during the absence of supply of oil pressure when no oil pressure is supplied from the hydraulic circuit and released during the supply of oil pressure when an oil pressure is supplied.

The meshing engagement element is preferably a brake disposed between a non-rotating member of the automatic transmission and a rotating element disposed rotatably relative to the non-rotating member to selectively couple the non-rotating member and the rotating element. The meshing engagement element is preferably a clutch disposed between multiple rotating elements disposed rotatably relative to the non-rotating member to selectively couple the multiple rotating elements.

A meshing engagement element at least partially disposed on the inner circumferential side of another one of the engagement elements is preferably a clutch disposed between an input shaft of the automatic transmission and a sun gear, a carrier, or a ring gear that is a rotating element of a planetary gear device included in the automatic transmission to selectively couple the input shaft and the rotating element. Alternatively, the meshing engagement element is a brake (planetary member brake) disposed between a non-rotating member of the automatic transmission and a sun gear, a carrier, or a ring gear that is a rotating element of a planetary gear device included in the automatic transmission to selectively couple (fix) the rotating element to the non-rotating member.

A meshing engagement element at least partially disposed on the inner circumferential side of at least one of the torque converter and the oil pump is preferably a clutch disposed between the input shaft of the automatic transmission and a sun gear, a carrier, or a ring gear that is a rotating element of a planetary gear device included in the automatic transmission to selectively couple the input shaft and the rotating element. Alternatively, the meshing engagement element is a brake (planetary member brake) disposed between a non-rotating member of the automatic transmission or a pump body of the oil pump and a sun gear, a carrier, or a ring gear that is a rotating element of a planetary gear device included in the automatic transmission to selectively couple (fix) the rotating element to the non-rotating member or the pump body.

A meshing engagement element at least partially disposed on the outer circumferential side of another one of the engagement elements is preferably a brake (planetary member brake) disposed between a non-rotating member of the automatic transmission and a sun gear, a carrier, or a ring gear that is a rotating element of a planetary gear device included in the automatic transmission to selectively couple (fix) the rotating element to the non-rotating member. A member on the other engagement element side of the meshing engagement element is configured integrally with the other engagement element, for example, a drum of a wet friction material, disposed on the inner circumferential side of the engagement element. A cylinder portion and a piston are included on the non-rotating member side of the meshing engagement element and the piston is disposed to be reciprocable (slidable) in the axial center direction and non-rotatable around the axial center relative to the non-rotating member. The meshing engagement element preferably has an engagement state thereof controlled depending on an oil pressure supplied from the hydraulic circuit via an oil passage formed in a housing (case) of the automatic transmission.

A meshing engagement element at least partially disposed on the outer circumferential side of the ring gear is preferably a brake (planetary member brake) disposed between a non-rotating member of the automatic transmission and a sun gear, a carrier, or a ring gear that is a rotating element of a planetary gear device included in the automatic transmission to selectively couple (fix) the rotating element to the non-rotating member. A member on the ring gear side of the meshing engagement element is integrally configured on the outer circumferential side of the ring gear. A cylinder portion and a piston are included on the non-rotating member side of the meshing engagement element and the piston is disposed to be reciprocable (slidable) in the axial center direction and non-rotatable around the axial center relative to the non-rotating member. The meshing engagement element preferably has an engagement state thereof controlled depending on an oil pressure supplied from the hydraulic circuit via an oil passage formed in a housing (case) of the automatic transmission.

A preferred embodiment of the present invention will now be described in detail with reference to the drawings.

First Embodiment

FIG. 1 is a schematic for explaining a configuration of a vehicle automatic transmission 10 to which the present invention is preferably applied. As depicted in FIG. 1, the automatic transmission 10 of this embodiment is a transversely mounted device preferably used in an FF vehicle etc., and has a single pinion type first planetary gear device 12 and a second planetary gear device 14 on the same axis so as to change rotation of an input shaft (input shaft member) 16 and output the rotation from an output rotating member 18. The input shaft 16 corresponds to an input member and is a turbine shaft of a torque converter 22 rotationally driven by an engine 20 that is an internal combustion engine for generating power of a vehicle in this embodiment. The output rotating member 18 corresponds to an output member of the automatic transmission 10 and acts as an output gear, i.e., a differential drive gear, meshed with a differential driven gear (large diameter gear) for transmitting power to a differential gear device not depicted. The output of the engine 20 is transmitted through the torque converter 22, the automatic transmission 10, the differential gear device, and a pair of axles acting as a drive shaft to a pair of drive wheels (front wheels). The automatic transmission 10 is substantially symmetrically configured relative to a center line and the lower half from the center line is not depicted in FIG. 1. The same applies to the following description.

The engine 20 is a drive source (main power source) generating a drive force for running and is an internal combustion engine such as a gasoline engine and a diesel engine combusting fuel to generate a drive force of a vehicle. The torque converter 22 includes a pump impeller 22a coupled to a crankshaft of the engine 20, a turbine impeller 22b coupled to the input shaft 16 of the automatic transmission 10, and a stator impeller 22c coupled via a one-way clutch to a housing (transmission case) 26 that is a non-rotating member and is a fluid transmission device transmitting the power generated by the engine 20 through fluid to the automatic transmission 10. A lockup clutch 24 is a direct clutch disposed between the pump impeller 22a and the turbine impeller 22b and is put into an engaged state, a slip state, or a released state through hydraulic control etc. The lockup clutch 24 is put into a completely engaged state to integrally rotate the pump impeller 22a and the turbine impeller 22b. The pump impeller 22a is coupled to a mechanical oil pump 28 described later and an oil pressure used as an original oil pressure etc. of the hydraulic circuit is generated by the oil pump 28 as the pump impeller 22a rotates.

The first planetary gear device 12 is a single pinion type planetary gear device including a sun gear S1, a plurality of pinion gears P1, a carrier CA1 supporting the pinion gears P1 in a rotatable and revolvable manner, and a ring gear R1 meshed with the sun gear S1 via the pinion gears P1. The second planetary gear device 14 is a single pinion type planetary gear device including a sun gear S2, a plurality of pinion gears P2, a carrier CA2 supporting the pinion gears P2 in a rotatable and revolvable manner, and a ring gear R2 meshed with the sun gear S2 via the pinion gears P2. The carrier CA1 of the first planetary gear device 12 and the ring gear R2 of the second planetary gear device 14 are integrally coupled, and the carrier CA1 and the ring gear R2 are coupled to the output rotating member 18. The ring gear R1 of the first planetary gear device 12 and the carrier CA2 of the second planetary gear device 14 are integrally coupled.

The automatic transmission 10 includes a plurality of engagement elements having an engagement state switched respectively between engagement and release. In particular, a first clutch C1 selectively engaging the input shaft 16 and the sun gear S1 of the first planetary gear device 12 is disposed between the input shaft 16 and the sun gear S1. A second clutch C2 selectively engaging the input shaft 16 and the ring gear R1 of the first planetary gear device 12 (carrier CA2) is disposed between the ring gear R1 coupled the input shaft 16 with each other and the carrier CA2 of the second planetary gear device 14. A third clutch C3 selectively engaging the input shaft 16 and the sun gear S2 of the second planetary gear device 14 is disposed between the input shaft 16 and the sun gear S2. A first brake B1 selectively engaging the ring gear R1 (carrier CA2) to the housing 26, that is a non-rotating member, is disposed between the ring gear R1 of the first planetary gear device 12 coupled the housing 26 with each other and the carrier CA2 of the second planetary gear device 14. In parallel with the first brake B1, a first one-way clutch F1 is disposed that allows the rotation of the ring gear R1 (carrier CA2) relative to the housing 26 in one direction and that is engaged to prevent the rotation in the opposite direction. A second brake B2 and a second one-way clutch F2 selectively engaging the sun gear S2 to the housing 26 are serially disposed between the housing 26 and the sun gear S2 of the second planetary gear device 14.

The first clutch C1, the third clutch C3 (hereinafter referred to as clutches C if not particularly distinguished from the second clutch C2), the first brake B1, the second brake B2, and the third brake B3 (hereinafter referred to as brakes B if not particularly distinguished) are well-known hydraulic friction engagement devices, for example, multi-plate clutches and brakes, having an engagement state controlled depending on an oil pressure supplied from a hydraulic circuit not depicted. The clutches C and the brakes B have engagement states switched between engagement and release, and transient oil pressures at the time of engagement and release controlled, by corresponding hydraulic actuators actuated depending on an oil pressure supplied from the hydraulic circuit by excitation/non-excitation and current control of a linear solenoid valve included in the hydraulic circuit.

The second clutch C2 is a well-known meshing engagement device (dog clutch) that includes a pair of engagement members having claw portions engaged with each other respectively corresponding to the input shaft 16 and the carrier CA2 (ring gear R1) and that has an engagement state switched by the pair of the engagement members relatively moved depending on an oil pressure supplied from the hydraulic circuit not depicted. Therefore, in this embodiment, among the clutches C and the brakes B that are multiple engagement elements included in the automatic transmission 10, the second clutch C2 corresponds to the meshing engagement element.

Figure 2:
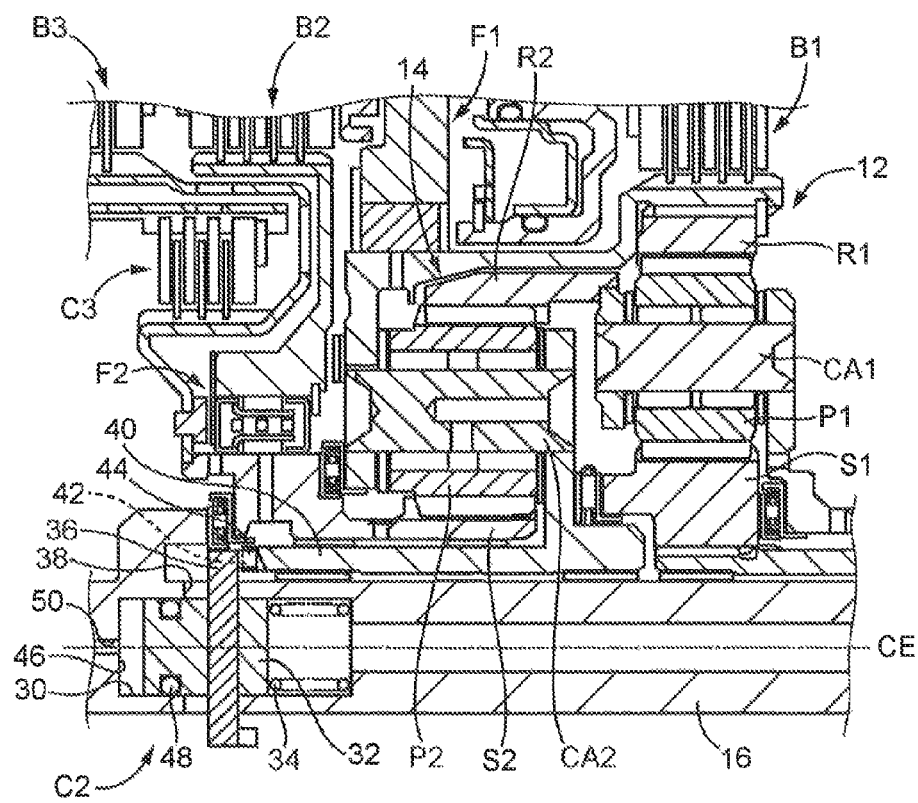
FIG. 2 is a partial cross-sectional view of a portion of the automatic transmission of FIG. 1 taken along a plane including a center axis for explaining the configuration of the meshing engagement element included in the automatic transmission of FIG. 1.

FIG. 2 is a partial cross-sectional view of a portion of the automatic transmission 10 taken along a plane including a center axis CE for explaining the configuration of the second clutch C2. As depicted in FIG. 2, the second clutch C2 includes a cylinder portion 30 formed in an inner circumferential portion (inner circumferential side) of the input shaft 16, a piston 32 disposed in the cylinder portion 30 to be reciprocable in the direction of the center axis CE of the automatic transmission 10 and relatively non-rotatable around the center axis CE, and a spring (return spring) 34 biasing the piston 32 in the direction (releasing direction) of releasing the engagement of claw portions 42 and 44 described later. The piston 32 is disposed integrally with a projecting portion 36 projecting from the piston 32 toward the outer circumferential side of the input shaft 16. A portion of the input shaft 16 corresponding to the projecting portion 36 is provided with a long hole 38 allowing the projecting portion 36 to move in the center axis CE direction in accordance with the reciprocation of the piston 32. An extended portion 40 extended toward the projecting portion 36 of the piston 32 is integrally formed on the inner circumferential side of the carrier CA2 and the claw portion 42 is formed at an end portion of the extended portion 40 on the projecting portion 36 side. The claw portion 44 intermeshed with the claw portion 42 is formed at an outer-circumferential-side end portion of the projecting portion 36 on the extended portion 40 side. An oil chamber 46 is formed between the cylinder portion 30 and the piston 32, and the oil chamber 46 is made oil-tight by an O-ring 48 that is an oil seal disposed on the piston 32. Therefore, with regard to the second clutch C2, the projecting portion 36 of the piston 32 and the extended portion 40 of the carrier CA2 correspond to a pair of the engagement members having the claw portions 42 and 44 engaged with each other.

The oil chamber 46 formed between the cylinder portion 30 and the piston 32 is supplied with an oil pressure from the hydraulic circuit via an oil passage (oil pressure supply hole) 50 formed inside (at the shaft center of) the input shaft 16. While an oil pressure (an oil pressure generating at least a force pushing back the spring 34 in the axial center direction of the piston 32) is supplied from the hydraulic circuit to the oil chamber 46, as depicted in FIG. 2, the piston 32 is pushed against a biasing force of the spring 34 toward the extended portion 40 of the carrier CA2, and the claw portions 42 and 44 respectively disposed on the projecting portion 36 and the extended portion 40 are meshed with each other. In other words, the second clutch C2 is engaged. Since the piston 32 is disposed non-rotatably around the center axis CE relative to the input shaft 16, the relative rotation of the input shaft 16 and the carrier CA2 (ring gear R1) is prevented by meshing the claw portions 42 and 44 with each other. While an oil pressure (an oil pressure generating at least a force pushing back the spring 34 in the axial center direction of the piston 32) is not supplied from the hydraulic circuit to the oil chamber 46, the piston 32 is pushed by the biasing force of the spring 34 toward the side opposite to the extended portion 40 of the carrier CA2 (the side away from the extended portion 40), and the meshing (engagement) of the claw portions 42 and 44 respectively disposed on the projecting portion 36 and the extended portion 40 is released. In other words, the second clutch C2 is released and the relative rotation of the input shaft 16 and the carrier CA2 (ring gear R1) is allowed.

As depicted in FIG. 2, the second clutch C2 is partially disposed on the inner circumferential side of the second one-way clutch F2 acting as an engagement element. In particular, constituent elements such as the piston 32, the spring 34, the projecting portion 36, the extended portion 40, and the claw portions 42, 44 forming a portion of the second clutch C2 are disposed on the radially inner side (around the center axis CE) of the second one-way clutch F2 in a portion overlapping with the second one-way clutch F2 in the center axis CE direction. The second clutch C2 may entirely be disposed on the inner circumferential side of the second one-way clutch F2. In particular, all the constituent elements of the second clutch C2 may be disposed radially inside the second one-way clutch F2 in the portion overlapping with the second one-way clutch F2 in the center axis CE direction.

As depicted in FIG. 2, the second clutch C2 is partially disposed on the inner circumferential side of the third clutch C3 acting as an engagement element. In particular, constituent elements such as the piston 32, the projecting portion 36, the long hole 38, the extended portion 40, and the claw portions 42, 44 forming a portion of the second clutch C2 are disposed radially inside, for example, a plurality of wet friction plates (clutch plates) of the third clutch C3 in a portion overlapping with a plurality of the wet friction plates in the center axis CE direction. The second clutch C2 may entirely be disposed on the inner circumferential side of the third clutch C3. In particular, all the constituent elements of the second clutch C2 may be disposed radially inside the third clutch C3 in the portion overlapping with the third clutch C3 in the center axis CE direction.

As described above, according to this embodiment, since at least one of the multiple engagement elements, i.e., the clutches C and the brakes B, is the second clutch C2 that is a meshing engagement element, and the second clutch C2 is at least partially disposed on the inner circumferential side of other engagement elements, i.e., the second one-way clutch F2 and the third clutch C3, the meshing engagement element can be disposed while a change is minimized in design of the other constituent elements, and the entire length of the automatic transmission 10 can be reduced as far as possible. Therefore, the vehicle automatic transmission 10 with a compact device configuration can be provided.

Other preferred embodiments of the present invention will be described in detail with reference to the drawings. In the following description, the portions mutually common to the embodiments are denoted by the same reference numerals and will not be described. The embodiment and the embodiments of the following description may be applied in a mutually combined manner.

Second Embodiment

FIG. 3 is a partial cross-sectional view of a portion of the automatic transmission 10 taken along a plane including the center axis CE for explaining the configuration of the first clutch C1, corresponding to an embodiment with the first clutch C1 defined as a meshing engagement element out of the clutches C and the brakes B that are the multiple engagement elements included in the automatic transmission 10. As depicted in FIG. 3, the first clutch C1 included in the automatic transmission of this embodiment includes a cylinder portion 52 formed in an inner circumferential portion (inner circumferential side) of the input shaft 16, a piston 54 disposed in the cylinder portion 52 to be reciprocable in the direction of the center axis CE of the automatic transmission 10 and relatively non-rotatable around the center axis CE, and a spring (return spring) 56 biasing the piston 54 in the direction (releasing direction) of releasing the engagement of claw portions 64 and 66 described later. The piston 54 is disposed integrally with a projecting portion 58 projecting from the piston 54 toward the outer circumferential side of the input shaft 16. A portion of the input shaft 16 corresponding to the projecting portion 58 is provided with a long hole 60 allowing the projecting portion 58 to move in the center axis CE direction in accordance with the reciprocation of the piston 54. An extended portion 62 extended toward the projecting portion 58 of the piston 54 is integrally formed on the inner circumferential side of the sun gear S1 and the claw portion 64 is formed at an end portion of the extended portion 62 on the projecting portion 58 side. The claw portion 66 intermeshed with the claw portion 64 is formed at an outer-circumferential-side end portion of the projecting portion 58 on the extended portion 62 side. An oil chamber 68 is formed between the cylinder portion 52 and the piston 54, and the oil chamber 68 is made oil-tight by an O-ring 70 that is an oil seal disposed on the piston 54. Therefore, with regard to the first clutch C1, the projecting portion 58 of the piston 54 and the extended portion 62 of the sun gear S1 correspond to a pair of the engagement members having the claw portions 64 and 66 engaged with each other.

The oil chamber 68 formed between the cylinder portion 52 and the piston 54 is supplied with an oil pressure from the hydraulic circuit via an oil passage (oil pressure supply hole) 72 formed inside (at the shaft center of) the input shaft 16. While an oil pressure (an oil pressure generating at least a force pushing back the spring 56 in the axial center direction of the piston 54) is supplied from the hydraulic circuit to the oil chamber 68, as depicted in FIG. 3, the piston 54 is pushed against a biasing force of the spring 56 toward the extended portion 62 of the sun gear S1, and the claw portions 64 and 66 respectively disposed on the projecting portion 58 and the extended portion 62 are meshed with each other. In other words, the first clutch C1 is engaged. Since the piston 54 is disposed non-rotatably around the center axis CE relative to the input shaft 16, the relative rotation of the input shaft 16 and the sun gear S1 is prevented by meshing the claw portions 64 and 66 with each other. While an oil pressure (an oil pressure generating at least a force pushing back the spring 56 in the axial center direction of the piston 54) is not supplied from the hydraulic circuit to the oil chamber 68, the piston 54 is pushed by the biasing force of the spring 56 toward the side opposite to the extended portion 62 of the sun gear S1 (the side away from the extended portion 62), and the meshing (engagement) of the claw portions 64 and 66 respectively disposed on the projecting portion 58 and the extended portion 62 is released. In other words, the first clutch C1 is released and the relative rotation of the input shaft 16 and the sun gear S1 is allowed.

As depicted in FIG. 3, the first clutch C1 is partially disposed on the inner circumferential side of the torque converter 22. In particular, constituent elements such as the cylinder portion 52, the piston 54, the projecting portion 58, the long hole 60, the oil chamber 68, the O-ring 70, and the oil passage 72 forming a portion of the first clutch C1 are disposed on the radially inner side (around the center axis CE) of a coupling portion 22d between the pump impeller 22a and the oil pump 28 (a rotator of the oil pump 28) in a portion overlapping with the coupling portion 22d in the center axis CE direction. The first clutch C1 may entirely be disposed on the inner circumferential side of the coupling portion 22d. In particular, all the constituent elements of the first clutch C1 may be disposed radially inside the coupling portion 22d in the portion overlapping with the coupling portion 22d in the center axis CE direction. The first clutch C1 may partially or entirely be disposed on the inner circumferential side of a portion corresponding to the pump impeller 22a, the turbine impeller 22b, the stator impeller 22c, etc. of the torque converter 22.

As depicted in FIG. 3, the first clutch C1 is partially disposed on the inner circumferential side of the oil pump 28 coupled to the torque converter 22. In particular, constituent elements such as the cylinder portion 52, the piston 54, the projecting portion 58, the long hole 60, the extended portion 62, and the claw portions 64, 66 forming a portion of the first clutch C1 are disposed radially inside the oil pump 28 (around the center axis CE) in a portion overlapping with the oil pump 28 in the center axis CE direction. The first clutch C1 may entirely be disposed on the inner circumferential side of the oil pump 28. In particular, all the constituent elements of the first clutch C1 may be disposed radially inside the oil pump 28 in the portion overlapping with the oil pump 28 in the center axis CE direction.

As described above, since this example includes the torque converter 22 coupled to the input shaft 16 that is the input rotating member of the automatic transmission 10 and the oil pump 28 coupled to the pump side, i.e., the pump impeller 22a, of the torque converter 22, and at least one of the multiple engagement elements, i.e., the clutches C and the brakes B, is the first clutch C1 that is a meshing engagement element, and the first clutch C1 is at least partially disposed on the inner circumferential side of at least one of the torque converter 22 and the oil pump 28, the meshing engagement element can be disposed while a change is minimized in design of the other constituent elements, and the entire length of the automatic transmission 10 can be reduced as far as possible. Therefore, the vehicle automatic transmission 10 with a compact device configuration can be provided.

Third Embodiment

FIG. 4 is a partial cross-sectional view of a portion of the automatic transmission 10 taken along a plane including the center axis CE for explaining the configuration of the second brake B2, corresponding to an embodiment with the second brake B2 defined as a meshing engagement element out of the clutches C and the brakes B that are the multiple engagement elements included in the automatic transmission 10. As depicted in FIG. 4, the second brake B2 included in the automatic transmission of this embodiment includes a cylinder portion 74 formed in an inner circumferential side of the housing 26, a piston 76 disposed in the cylinder portion 74 to be reciprocable in the direction of the center axis CE of the automatic transmission 10 and relatively non-rotatable around the center axis CE, and a spring 78 biasing the piston 76 in the direction of releasing the engagement of claw portions 82 and 86 described later. A coupling member 80 coupling the second one-way clutch F2 and the second brake B2 is disposed on the outer circumferential side of the second one-way clutch F2 and the claw portion 82 is formed at an end portion of the coupling member 80 on the outer circumferential side. A projecting portion 84 projecting toward the coupling member 80 is disposed on the coupling member 80 (second one-way clutch F2) side of the piston 76 and the claw portion 86 intermeshed with the claw portion 82 is formed at an end portion of the projecting portion 84 on the coupling member 80 side. An oil chamber 88 is formed between the cylinder portion 74 (housing 26) and the piston 76, and the oil chamber 88 is made oil-tight by an O-ring 90 that is an oil seal disposed on the piston 76. Therefore, with regard to the second brake B2, the projecting portion 84 of the piston 76 and the coupling member 80 correspond to a pair of the engagement members having the claw portions 82 and 86 engaged with each other.

The oil chamber 88 formed between the cylinder portion 74 and the piston 76 is supplied with an oil pressure from the hydraulic circuit via an oil passage (oil pressure supply hole) 92 formed in the housing 26. While an oil pressure (an oil pressure generating at least a force pushing back the spring 78 in the axial center direction of the piston 76) is supplied from the hydraulic circuit to the oil chamber 88, as depicted in FIG. 4, the piston 76 is pushed against a biasing force of the spring 78 toward the coupling member 80, and the claw portions 82 and 86 respectively disposed on the coupling member 80 and the projecting portion 84 are meshed with each other. In other words, the second brake B2 is engaged. Since the piston 76 is disposed non-rotatably around the center axis CE relative to the cylinder portion 74 i.e. the housing 26, the relative rotation relative to the housing 26 of the coupling member 80 is prevented by meshing the claw portions 82 and 86 with each other. In this state, the second one-way clutch F2 acts as an engagement element allowing the rotation of the sun gear S2 relative to the housing 26 in one direction and engaged to prevent the rotation in the opposite direction. While an oil pressure (an oil pressure generating at least a force pushing back the spring 78 in the axial center direction of the piston 76) is not supplied from the hydraulic circuit to the oil chamber 88, the piston 76 is pushed by the biasing force of the spring 78 toward the side opposite to the coupling member 80 (the side away from the coupling member 80), and the meshing (engagement) of the claw portions 82 and 86 respectively disposed on the coupling member 80 and the projecting portion 84 is released. In other words, the second brake B2 is released and the relative rotation relative to the housing 26 of the coupling member 80 is allowed.

As depicted in FIG. 4, the second brake B2 is partially disposed on the outer circumferential side of the second one-way clutch F2 acting as an engagement element. In particular, constituent elements such as the piston 76, the spring 78, the coupling member 80, the claw portions 82, 86 and the projecting portion 84 forming a portion of the second brake B2 are disposed on the radially outer side (around the center axis CE) of the second one-way clutch F2 in a portion overlapping with the second one-way clutch F2 in the center axis CE direction. The second brake B2 may entirely be disposed on the outer circumferential side of the second one-way clutch F2. In particular, all the constituent elements of the second brake B2 may be disposed radially outside the second one-way clutch F2 in the portion overlapping with the second one-way clutch F2 in the center axis CE direction.

As depicted in FIG. 4, the second brake B2 is partially disposed on the outer circumferential side of the third clutch C3 acting as an engagement element. In particular, constituent elements such as the coupling member 80, the claw portions 82, 86 and the projecting portion 84 forming a portion of the second brake B2 are disposed on the radially outer side (around the center axis CE) of, for example, a plurality of wet friction plates (clutch plates) of the third clutch C3 in a portion overlapping with the plurality of wet friction plates in the center axis CE direction. Preferably, the coupling member 80 is configured integrally with a dram of the third clutch C3 etc. The second brake B2 may entirely be disposed on the outer circumferential side of the third clutch C3. In particular, all the constituent elements of the second brake B2 may be disposed radially outside the third clutch C3 in the portion overlapping with the third clutch C3 in the center axis CE direction.

As described above, according to this embodiment, since at least one of the multiple engagement elements, i.e., the clutches C and the brakes B, is the second brake B2 that is a meshing engagement element, and the second brake B2 is at least partially disposed on the outer circumferential side of other engagement elements, i.e., the second one-way clutch F2 and the third clutch C3, the meshing engagement element can be disposed while a change is minimized in design of the other constituent elements, and the entire length of the automatic transmission 10 can be reduced as far as possible. Therefore, the vehicle automatic transmission 10 with a compact device configuration can be provided.

Fourth Embodiment

Figure 5:
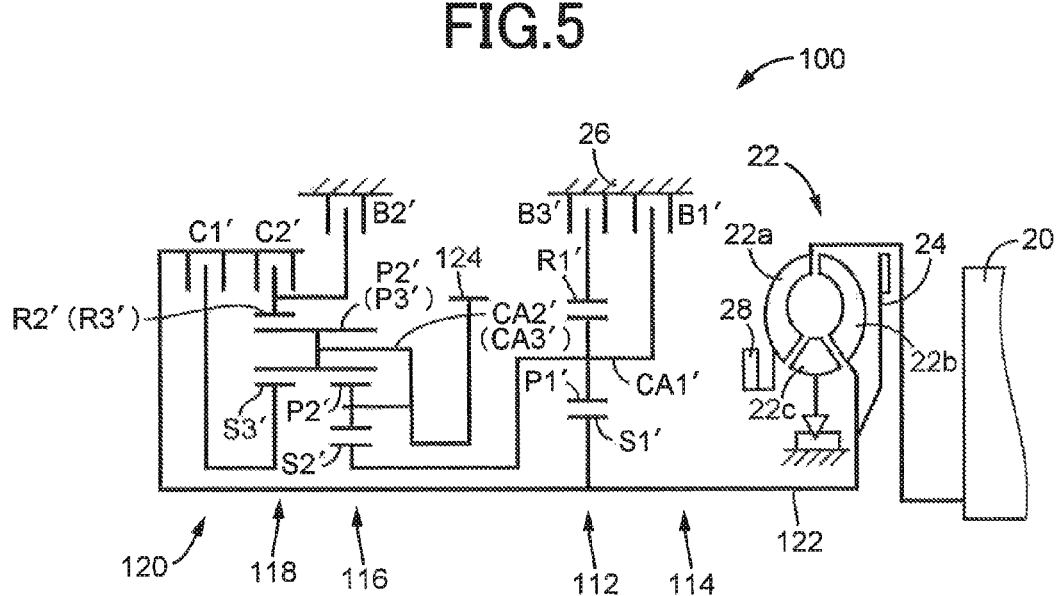
FIG. 5 is a schematic for explaining a configuration of another vehicle automatic transmission to which the present invention is preferably applied.

FIG. 5 is a schematic for explaining a configuration of another vehicle automatic transmission 100 to which the present invention is preferably applied. As depicted in FIG. 5, the automatic transmission 100 of this embodiment is a transversely mounted device preferably used in an FF vehicle etc., and has a first transmission portion 114 mainly made up of a single pinion type first planetary gear device 112 and a second transmission portion 120 mainly made up of a double pinion type second planetary gear device 116 and a single pinion type third planetary gear device 118 on the same axis so as to change rotation of an input shaft 122 and output the rotation from an output rotating member 124. The input shaft 122 corresponds to an input rotating member and is a turbine shaft of the torque converter 22 rotationally driven by the engine 20 in this embodiment. The output rotating member 124 corresponds to an output member of the automatic transmission 100 and acts as an output gear, i.e., a differential drive gear, meshed with a differential driven gear (large diameter gear) for transmitting power to a differential gear device not depicted. The output of the engine 20 is transmitted through the torque converter 22, the automatic transmission 100, the differential gear device, and a pair of axles acting as a drive shaft to a pair of drive wheels (front wheels).

The first planetary gear device 112 is a single pinion type planetary gear device including a sun gear S1', a plurality of pinion gears P1', a carrier CA1' supporting the pinion gears P1' in a rotatable and revolvable manner, and a ring gear R1' meshed with the sun gear S1' via the pinion gears P1'. The second planetary gear device 116 and the third planetary gear device 118 are configured to be a Ravigneaux type with a ring gear R2' (R3') and a carrier CA2' (CA3') integrally configured. The second planetary gear device 116 is a double pinion type planetary gear device including a plurality of pinion gears P2' meshed with each other, supporting the pinion gears P2' in a rotatable and revolvable manner by the carrier CA2', and including a sun gear S2' meshed with the ring gear R2' via the pinion gears P2'. The third planetary gear device 118 is a single pinion type planetary gear device including a plurality of pinion gears P3', supporting the pinion gears P3' in a rotatable and revolvable manner by the carrier CA3', and including a sun gear S3' meshed with the ring gear R3' via the pinion gears P3'. The sun gear S1' of the first planetary gear device 112 is coupled to the input shaft 122. The carrier CA1' of the first planetary gear device 112 and the sun gear S2' of the second planetary gear device 116 are integrally coupled. The carrier CA2 of the second planetary gear device 116 (carrier CA3' of the third planetary gear device 118) is coupled to the output rotating member 124.

The automatic transmission 100 includes a plurality of engagement elements having an engagement state switched by an oil pressure. In particular, a first clutch C1' selectively engaging the input shaft 122 and the sun gear S3' is disposed between the input shaft 122 and the sun gear S3' of the third planetary gear device 118. A second clutch C2' selectively engaging the input shaft 122 and the ring gear R2' (R3') is disposed between the input shaft 122 and the ring gear R2' of the second planetary gear device 116 (ring gear R3' of the third planetary gear device 118). A first brake B1' selectively engaging the carrier CA1' (sun gear S2') to the housing 26 is disposed between the housing 26 that is a non-rotating member and the carrier CA1' of the first planetary gear device 112 (sun gear S2' of the second planetary gear device 116). A second brake B2' selectively engaging the ring gear R2' (R3') to the housing 26 is disposed between the housing 26 and the ring gear R2' of the second planetary gear device 116 (ring gear R3' of the third planetary gear device 118). A third brake B3' selectively engaging the ring gear R1' to the housing 26 is disposed between the housing 26 and the ring gear R1' of the first planetary gear device 112.

The first clutch C1', the second clutch C2' (hereinafter referred to as clutches C' if not particularly distinguished), the first brake B1' and the third brake B3' (hereinafter referred to as brakes B' if not particularly distinguished from the second brake B2') are well-known hydraulic friction engagement devices, for example, multiplate clutches and brakes, having an engagement state controlled depending on an oil pressure supplied from a hydraulic circuit not depicted. The clutches C' and the brakes B' have engagement states switched between engagement and release, and transient oil pressures at the time of engagement and release controlled, by corresponding hydraulic actuators actuated depending on an oil pressure supplied from the hydraulic circuit by excitation/non-excitation and current control of a linear solenoid valve included in the hydraulic circuit.

The second brake B2' is a well-known meshing engagement device (dog clutch) that includes a pair of engagement members having claw portions engaged with each other respectively corresponding to the housing 26 and the ring gear R2' of the second planetary gear device 116 (ring gear R3' of the third planetary gear device 118) and that has an engagement state switched by the pair of the engagement members relatively moved depending on an oil pressure supplied from the hydraulic circuit not depicted. Therefore, in this embodiment, among the clutches C' and the brakes B' that are multiple engagement elements included in the automatic transmission 100, the second brake B2' corresponds to the meshing engagement element.

Figure 6:
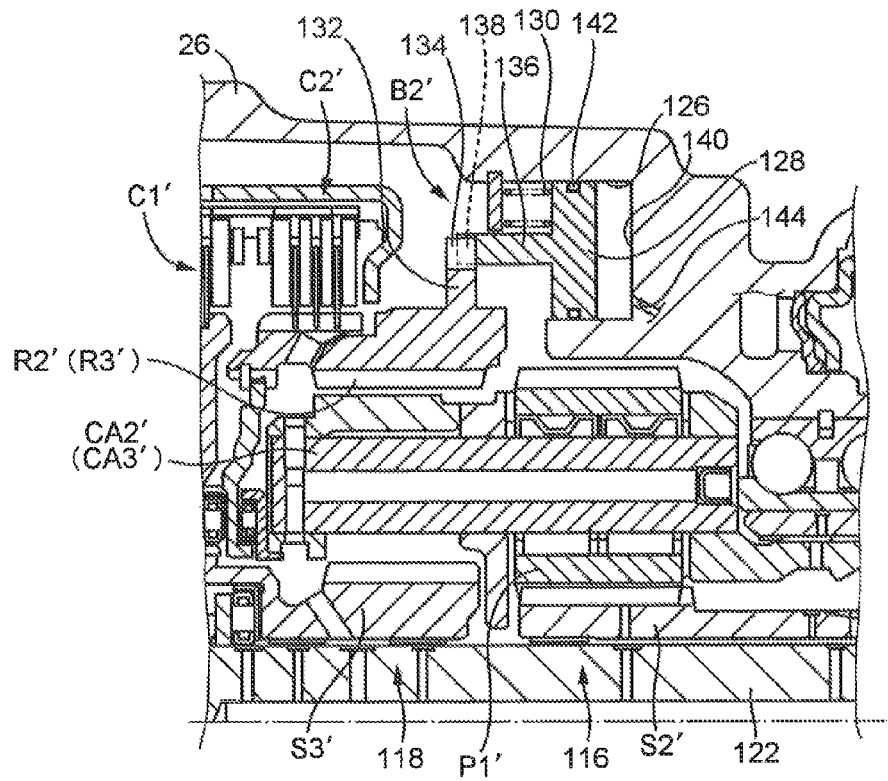
FIG. 6 is a partial cross-sectional view of a portion of the automatic transmission of FIG. 5 taken along a plane including a center axis for explaining the configuration of the meshing engagement element included in the automatic transmission of FIG. 5.

FIG. 6 is a partial cross-sectional view of a portion of the automatic transmission 100 taken along a plane including the center axis CE for explaining the configuration of the second brake B2', corresponding to an embodiment with the second brake B2' defined as a meshing engagement element out of the clutches C' and the brakes B' that are the multiple engagement elements included in the automatic transmission 100. As depicted in FIG. 6, the second brake B2' includes a cylinder portion 126 formed in an inner circumferential side of the housing 26, a piston 128 disposed in the cylinder portion 126 to be reciprocable in the direction of the center axis CE of the automatic transmission 100 and relatively non-rotatable around the center axis CE, and a spring 130 biasing the piston 128 in the direction of releasing the engagement of claw portions 134 and 138 described later. A projecting portion 132 projecting from the ring gear R2' (R3') toward a projecting portion 136 of the piston 128 is disposed on the outer circumferential side of the ring gear R2' of the second planetary gear device 116 (ring gear R3' of the third planetary gear device 118) and the claw portion 134 is formed at an end portion of the projecting portion 132 on the outer circumferential side. A projecting portion 136 projecting toward the projecting portion 132 is disposed on the projecting portion 132 (ring gear R2') side of the piston 128 and the claw portion 138 intermeshed with the claw portion 134 is formed at an end portion of the projecting portion 136 on the projecting portion 132 side. An oil chamber 140 is formed between the cylinder portion 126 (housing 26) and the piston 128, and the oil chamber 140 is made oil-tight by an O-ring 142 that is an oil seal disposed on the piston 128. Therefore, with regard to the second brake B2, the projecting portion 136 of the piston 128 and the projecting portion 132 of the ring gear R2' correspond to a pair of the engagement members having the claw portions 134 and 138 engaged with each other.

The oil chamber 140 formed between the cylinder portion 126 and the piston 128 is supplied with an oil pressure from the hydraulic circuit via an oil passage (oil pressure supply hole) 144 formed in the housing 26. While an oil pressure (an oil pressure generating at least a force pushing back the spring 130 in the axial center direction of the piston 128) is supplied from the hydraulic circuit to the oil chamber 140, as depicted in FIG. 6, the piston 128 is pushed against a biasing force of the spring 130 toward the projecting portion 132 of the ring gear R2' (R3'), and the claw portions 134 and 138 respectively disposed on the projecting portion 132 and the projecting portion 136 of the piston 128 are meshed with each other. In other words, the second brake B2 is engaged. Since the piston 128 is disposed non-rotatably around the center axis CE relative to the cylinder portion 126 i.e. the housing 26, the relative rotation relative to the housing 26 of the ring gear R2' (R3') is prevented by meshing the claw portions 134 and 138 with each other. While an oil pressure (an oil pressure generating at least a force pushing back the spring 130 in the axial center direction of the piston 128) is not supplied from the hydraulic circuit to the oil chamber 140, the piston 128 is pushed by the biasing force of the spring 130 toward the side opposite to the projecting portion 132 of the ring gear R2' (R3') (the side away from the coupling member 132), and the meshing (engagement) of the claw portions 134 and 138 respectively disposed on the projecting portion 132 and the projecting portion 136 of the piston 128 is released. In other words, the second brake B2 is released and the relative rotation relative to the housing 26 of the ring gear R2' (R3') is allowed.

As depicted in FIG. 6, the second brake B2 is partially disposed on the outer circumferential side of the ring gear R2' of the second planetary gear device 116 (ring gear R3' of the third planetary gear device 118). In particular, constituent elements such as the piston 128, the projecting portion 132, 136, the claw portions 134, 138 forming a portion of the second brake B2 are disposed on the radially outer side (around the center axis CE) of the ring gear R2' (R3') in a portion overlapping with the ring gear R2' in the center axis CE direction. The second brake B2 may entirely be disposed on the outer circumferential side of the ring gear R2' (R3'). In particular, all the constituent elements of the second brake B2 may be disposed radially outside the ring gear R2' in the portion overlapping with the ring gear R2' in the center axis CE direction.

As described above, according to this embodiment, since the automatic transmission 100 includes the second planetary gear device 116 having the sun gear S2', the carrier CA2' and the ring gear R2', at least one of the multiple engagement elements, i.e., the clutches C' and the brakes B' is the second brake B2' that is a meshing engagement element, and the second brake B2' is at least partially disposed on the outer circumferential side of the ring gear R2', the meshing engagement element can be disposed while a change is minimized in design of the other constituent elements, and the entire length of the automatic transmission 100 can be reduced as far as possible. Therefore, the vehicle automatic transmission 100 with a compact device configuration can be provided.

Although the preferred embodiments of the present invention have been described in detail with reference to the drawings, the present invention is not limited thereto and is implemented with various modifications applied within a range not departing from the spirit thereof.

NOMENCLATURE OF ELEMENTS 10, 100: vehicle automatic transmission 12: first planetary gear device 14: second planetary gear device 16: input shaft 18: output rotating member 20: engine 22: torque converter 22a: pump impeller 22b: turbine impeller 22c: stator impeller 22d: coupling portion 24: lockup clutch 26: housing 28: oil pump 30: cylinder portion 32: piston 34: spring 36: projecting portion 38: long hole 40: extended portion 42, 44: claw portions 46: oil chamber 48: O-ring 50: oil passage 52: cylinder portion 54: piston 56: spring 58: projecting portion 60: long hole 62: extended portion 64, 66: claw portions 68: oil chamber 70: O-ring 72: oil passage 74: cylinder portion 76: piston 78: spring 80: coupling member 82, 86: claw portions 84: projecting portion 88: oil chamber 90: O-ring 92: oil passage 112: first planetary gear device 114: first transmission portion 116: second planetary gear device 118: third planetary gear device 120: second transmission portion 122: input shaft 124: output rotating member 126: cylinder portion 128: piston 130: spring 132, 136: projecting portions 134, 138: claw portions 140: oil chamber 142: O-ring 144: oil passage B1, B1': first brakes (engagement element) B2, B2': second brakes (engagement element) B3, B3': third brakes (engagement element) C1, C1': first clutches (engagement element) C2, C2': second clutches (engagement element) CA1, CA2, CA1', CA2', CA3': carriers F1: first one-way clutch (engagement element) F2: second one-way clutch (engagement element) P1, P2, P1', P2', P3': pinion gears R1, R2, R1', R2', R3': ring gears S1, S2, S1', S2', S3': sun gears

The invention claimed is:

1. A vehicle automatic transmission of a multistage type having a plurality of shift stages selectively established depending on a combination of engagement and release of multiple engagement elements, comprising:
   a torque converter coupled to an input rotating member of the automatic transmission; and
   an oil pump coupled to a pump side of the torque converter,
   at least one of the multiple engagement elements being a meshing engagement element, and the meshing engagement element being at least partially disposed on an inner circumferential side of at least one of the torque converter and the oil pump, wherein the meshing engagement element includes a portion which is located inwardly of the at least one of the torque converter and the oil pump in a radial direction perpendicular to an axis of the vehicle automatic transmission, and which overlaps with the at least one of the torque converter and the oil pump in an axial direction parallel to the axis of the vehicle automatic transmission.

2. A vehicle automatic transmission of a multistage type having a plurality of shift stages selectively established depending on a combination of engagement and release of multiple engagement elements, comprising:
   a torque converter coupled to an input rotating member of the automatic transmission; and
   an oil pump coupled to a pump side of the torque converter,
   at least one of the multiple engagement elements being a meshing engagement element, and the meshing engagement element being at least partially disposed on an inner circumferential side of at least one of the torque converter and the oil pump,
   the vehicle automatic transmission further comprising
   an output rotating member; and
   a planetary gear device configured to transmit power inputted to the input rotating member, to the output rotating member,
   wherein the meshing engagement element is disposed between the input rotating member and a rotating element of the planetary gear device, and is configured to selectively engage the input rotating member and the rotating element.

\* \* \* \* \*